(12) United States Patent
Kakavand et al.

(10) Patent No.: US 11,474,971 B2
(45) Date of Patent: Oct. 18, 2022

(54) SYSTEM AND METHOD FOR CREATING A MUTUAL REFERENCE BETWEEN A BLOCKCHAIN AND A PRIVATE REPOSITORY

(71) Applicant: Luther Systems US Incorporated, Los Gatos, CA (US)

(72) Inventors: Hossein Kakavand, London (GB); Samuel Wood, Los Altos Hills, CA (US)

(73) Assignee: LUTHER SYSTEMS US INCORPORATED, Los Gatos, CA (US)

( * ) Notice: Subject to any disclaimer, the term of this patent is extended or adjusted under 35 U.S.C. 154(b) by 110 days.

(21) Appl. No.: 16/052,559

(22) Filed: Aug. 1, 2018

(65) Prior Publication Data
US 2018/0341648 A1 Nov. 29, 2018

Related U.S. Application Data

(63) Continuation of application No. PCT/US2017/016380, filed on Feb. 3, 2017.
(Continued)

(51) Int. Cl.
*G06F 16/00* (2019.01)
*G06F 21/64* (2013.01)
(Continued)

(52) U.S. Cl.
CPC .......... *G06F 16/00* (2019.01); *G06F 16/1873* (2019.01); *G06F 21/645* (2013.01);
(Continued)

(58) Field of Classification Search
CPC ........ G06F 16/00; G06F 21/645; G06F 21/60; G06F 16/182; G06Q 50/18; G06Q 20/065;
(Continued)

(56) References Cited

U.S. PATENT DOCUMENTS 5,680,611 A 10/1997 Rail et al.
5,696,898 A * 12/1997 Baker .................. H04L 9/40
707/999.009

(Continued)

FOREIGN PATENT DOCUMENTS

GB 2571390 8/2019
GB 2571390 A 8/2019
(Continued)

OTHER PUBLICATIONS

Reed, U.S. Appl. No. 62/116,853, filed Feb. 16, 2015 (Year: 2015).*
(Continued)

*Primary Examiner* — John W Hayes
*Assistant Examiner* — Dennis G Keritsis
(74) *Attorney, Agent, or Firm* — Manatt, Phelps & Phillips LLP

(57) ABSTRACT

A system and method for the secure management of digital contracts utilizes technology from the following fields: digital timestamping, encryption, distributed storage, and distributed payment systems. The existing state-of-the-art contract management systems require counter-parties to give a substantial level of trust to third parties to perform functions such as storage and verification. This system and method reduces the amount of trust that the counterparties need to give to a single third party. The system and method may be used for the secure construction and management of digital contract data and metadata.

22 Claims, 4 Drawing Sheets

Related U.S. Application Data

(60) Provisional application No. 62/290,863, filed on Feb. 3, 2016.

(51) Int. Cl.
    *G06Q 50/18*     (2012.01)
    *H04L 9/40*     (2022.01)
    *G06F 40/197*     (2020.01)
    *G06F 16/18*     (2019.01)
    *G06Q 20/06*     (2012.01)
    *H04L 67/02*     (2022.01)

(52) U.S. Cl.
CPC ......... *G06F 40/197* (2020.01); *G06Q 20/065* (2013.01); *G06Q 50/18* (2013.01); *G06Q 50/188* (2013.01); *H04L 9/40* (2022.05); *H04L 67/02* (2013.01)

(58) Field of Classification Search
CPC .. G06Q 50/188; G06Q 20/223; G06Q 20/405; H04L 29/06; H04L 2463/102; H04L 2463/121; H04L 2209/38
See application file for complete search history.

(56) References Cited

U.S. PATENT DOCUMENTS

| | | | | |
|---|---|---|---|---|
| 5,892,900 | A * | 4/1999 | Ginter | G06F 21/10 726/26 |
| 8,918,890 | B2 * | 12/2014 | Nakazawa | G06Q 30/06 726/26 |
| 10,075,298 | B2 * | 9/2018 | Struttmann | H04L 9/0618 |
| 10,579,974 | B1 * | 3/2020 | Reed | G06Q 20/105 |
| 11,126,975 | B2 * | 9/2021 | Haldenby | G06Q 50/08 |
| 11,223,877 | B2 * | 1/2022 | Madisetti | G06F 16/1824 |
| 2002/0120682 | A1 * | 8/2002 | Funaki | H04L 29/12594 709/203 |
| 2003/0233357 | A1 * | 12/2003 | Merenda | G06F 16/958 707/999.005 |
| 2007/0239589 | A1 | 10/2007 | Wilson, Jr. et al. | |
| 2015/0221034 | A1 | 8/2015 | Nyhoff et al. | |
| 2015/0244690 | A1 | 8/2015 | Mossbarger | |
| 2015/0332283 | A1 | 11/2015 | Witchey | |
| 2015/0379510 | A1 | 12/2015 | Smith | |
| 2016/0028552 | A1 * | 1/2016 | Spanos | H04L 9/3236 713/178 |
| 2016/0357550 | A1 | 12/2016 | Thomas et al. | |
| 2017/0048217 | A1 * | 2/2017 | Biggs | H04L 63/123 |
| 2017/0075938 | A1 * | 3/2017 | Black | G06F 21/64 |
| 2017/0091750 | A1 * | 3/2017 | Maim | H04L 9/30 |
| 2017/0103385 | A1 | 4/2017 | Wilson, Jr. et al. | |
| 2017/0103468 | A1 | 4/2017 | Orsini et al. | |
| 2017/0193619 | A1 * | 7/2017 | Rollins | G06Q 50/18 |
| 2018/0341648 | A1 | 11/2018 | Kakavand et al. | |
| 2018/0341678 | A1 | 11/2018 | Moerkotte et al. | |
| 2019/0361842 | A1 | 11/2019 | Wood et al. | |
| 2020/0111092 | A1 | 4/2020 | Wood et al. | |
| 2020/0159697 | A1 | 5/2020 | Wood et al. | |
| 2020/0201964 | A1 | 6/2020 | Nandakumar | |
| 2021/0056070 | A1 | 2/2021 | Kakavand et al. | |

FOREIGN PATENT DOCUMENTS

| | | |
|---|---|---|
| WO | WO 2015/171580 | 12/2015 |
| WO | 2016/171580 | 12/2016 |
| WO | WO2018201009 A1 | 11/2018 |

OTHER PUBLICATIONS

Association of International Certified Professional Accountants, Blockchain Universal Glossary (Year: 2020).*
Bitcoind—Bitcoin Wiki (Year: 2019).*
How To Setup Bitcoin Core—YouTube (Year: 2020).*
Running A Full Node—Bitcoin (Year: 2022).*
Running Bitcoin—Bitcoin Wiki (Year: 2019).*
Yaga, NIST.IR.8202, Oct. 2018 (Year: 2018).*
Keritsis, 16383720,Notice_of_Allowance_and_Fees_Due_(PTOL-85), dated Oct. 25, 2021 (Year: 2021).*
Doerner, Jack, entitled, "An Introduction to Practical Multiparty Computation," 53 pp.
"Intel$^R$ Software Guard Extension (SGX) Remote Attestation End-To-End Sample," GitHub, (2018), 9 pp.
Lamport, Leslie et al., entitled, "The Byzantine Generals Problem," ACM Transactions on Programming Languages and Systems, (Jul. 1982), vol. 4, No. 3, pp. 382-401.
Manber, Udi, entitled, "Finding Similar Files in a Large File System," 1994 Winter USENIX Technical Conference, (Oct. 1993), 1-10 pp.
Nakamoto, Satoshi, entitled, "Bitcoin: A Peer-to-Peer Electronic Cash System," pp. 1-9.
Pilkington, Marc, entitled, "Blockchain Technology: Principles and Applications," Blockchain Technology: Principles and Applications, 39 pp.
PCT/US17/016380, dated Sep. 6, 2017, entitled International Search Report (4 pgs.).
PCT/US17/016380, dated Sep. 6, 2017, entitled Written Opinion Of The International Searching Authority (5 pgs.).
Clack et al. "Smart Contract Templates: essential requirements and design options." In: arXivpreprint. Dec. 15, 2016 (Dec. 12, 2016), 15 pages. Retrieved from: https://arxiv.org/pdf/1612.04496.pdf.
Kosba et al. "Hawk: The blockchain model of cryptography and privacy-preserving smart contracts." In: IEEE symposium on security and privacy. May 26, 2016 (May 26, 2016), 20 pages. Retrieved from: https://ieeexplore.ieee.org/stamp/stamp.jsp?tp=&arnumber=7546538.
Peters et al., "Understanding modern banking ledgers through blockchain technologies: Future of transaction processing and smart contracts on the internet of money." In: Banking Beyond Banks and Money. Nov. 18, 2015 (Nov. 18, 2015), 33 pages. Retrieved from: https://arxiv.org/pdf/1511.05740.pdf.
The Intel Xeon Scalable—A Truly Big Day for the Data Center, Intel's Newest Platform Designed for the Data Center is Its Highest Performance, Most Versatile Ever, Jul. 11, 2017, 5 pages. Editorial (https://newsroom.intel.com/editorials/).
Kakavand et al. "The blockchain revolution: An analysis of regulation and technology related to distributed ledger technologies." Oct. 12, 2016 (Oct. 12, 2016), 27 pages. Retrieved from: https://papers.ssrn.com/sol3/papers.cfm?abstract_id=2849251.
Kosba et al. "Hawk: The blockchain model of cryptography and privacy-preserving smart contract." In: IEEE symposium on security and privacy. May 26, 2016 (May 26, 2016), 20 pages. Retrieved from: https://ieeexplore.ieee.org/stamp/stamp.jsp?tp=&arnumber=7546538.
Peters et al., "Understanding modern banking ledgers through blockchain technologies: Future of transaction processing and smart contract on the internet of money." In: Banking Beyond Banks and Money. Nov. 18, 2016 (Nov. 18, 2016), 33 pages. Retrieved from: https://arxiv.org/pdf/1511.05740.pdf.
Hassan et al., "Blockchain And The Future of the Internet: A Comprehensive Review," Information Technology University (ITU), Punjab, Pakistan, Feb. 23, 2019, 21 pages. Retrieved from: https://arxiv.org/pdf/1904.00733.pdf.
Reed, "Distributed Intelligent Agents System and Method For Securely Operating A Digital Virtual Currency", U.S. Appl. No. 62/116,863, filed Feb. 16, 2015.
Esposito et al., "Blockchain: A Panacea for Healthcare Cloud-Based Data Security and Privacy?", IEEE Cloud Computing, vol. 5, Jan./Feb. 2018, pp. 31-37 (8 pages).
Manber, Udi, entitled, "Finding Similar Files in a Large File System," TR 93-33—1994 Winter USENIX Technical Conference, Department of Computer Science, The University of Arizona, Tucson, Arizona, (Oct. 1993), 11 pages.
The Intel Xeon Scalable—a Truly Big Day for the Data Center, Intel's Newest Platform Designed for the Data Center is Its Highest Performance, Most Versatile Ever, Jul. 11, 2017, 5 pages.

(56) References Cited

OTHER PUBLICATIONS

Ali, Robert et al., entitled, "Innovation in payment technologies and the emergence of digital currencies," Quarterly Bulletin, (2014) Q3, pp. 262-275.
Vipula, Rawte et al., entitled, "Fraud Detection in Health Insurance Data Mining Techniques," 2015 International Conference on Communication, Information & Computing Technology (ICCICT), (Jan. 16-17, 2015), 6 pp.
Bahmani, Raad et al., entitled, "Secure Multiparty Computation from SGX," 38 pp.
BitFury Group, entitled, "Proof of Stake versus Proof of Work," White Paper, (Sep. 13, 2015), pp. 1-26.
Bloom, Burton H., entitled, "Space/Time Trade-offs in Hash Coding with Allowable Errors," Communications of the ACM, (Jul. 1970), vol. 13, No. 7, pp. 422-426.
Doemer, Jack, entitled, "An Introduction to Practical Multiparty Computation," 53 pp.
Fan, Li et al., entitled, "Summary Cache. A Scalable Wide-Area Web Cache Sharing Protocol," IEEE/ACM Transactions on Networking, (Jun. 2000), vol. 8, No. 3., pp. 281-293.
"Intel$^R$ Software Guard Extension (SGC) Remote Attestation End-To-End Sample," GitHub, (2018), 9 pp.
O'Keeffe, Dan et al., entitled, "Spectre-attack-sgx," GitHub, (2018), 2 pp.
Kakavand, Hossein et al., entitled, "The Blockchain Revolution: An Analysis of Regulation and Technology Related to Distributed Ledger Technologies," 27 pp.
Kwon, Jae, entitled, "Tendermint: Consensus without Mining," Draft v.0.6, pp. 1-11.
Lamport, Leslie et al., entitled, "The Byzantine Generals Problem," ACM Transactions on Programming Languages and Systems, (Jul. 1982), vol. 4, No. 3, pp. 381-401.
Manber, Udi, entitled, "Finding Similar Fiies in a Large File System" 1994 Winter USENIX Technical Conference, (Oct. 1993), 1-10 pp.
Nakamoto, Satoshi, entitled, "Bitcoln: A Peer-to-Peer Electronic Cash System," pp. 1-9.
Piikington, Marc, entitled, "Blockchain Technology: Principles and Application," Blockchain Technology: Principles and Applications, 39 pp.
Pinkas, Benny et al., entitled, "Phasing: Private Set Intersection using Permutation-based Hashing," Usenix Security, (2015) PSSZ15, pp. 1-21.
Rindal, Peter et al., entitled, "Improved Private Set Intersection against Malicious Adversaries," (Oct. 3, 2016), pp, 1-18.
"Summary of the HIPAA," Health Information Privacy, U.S. Department of Health and Human Services, (2013), pp. 8.
"The Intel Xeon Scalable—A Truly Big Day for the Data Center," (Jul. 11, 2017), 5 pp.
Clack et al., entitled, "Smart Contract Templates: essential requirements and design options." In: arXivpreprint. Dec. 15, 2016 (Dec. 15, 2016) Retrieved from <https://arxiv.org/pdf/1612.04496.pdf> entire document.

* cited by examiner

Secure Contract Management System Environment 100

SYSTEM AND METHOD FOR CREATING A MUTUAL REFERENCE BETWEEN A BLOCKCHAIN AND A PRIVATE REPOSITORY

CROSS-REFERENCE TO RELATED APPLICATION

This application claims the benefit under 35 USC 120 as continuation of International Application No. PCT/US2017/16380, filed Feb. 3, 2017, and titled "SYSTEM AND METHOD FOR SECURE MANAGEMENT OF DIGITAL CONTRACTS" and U.S. Provisional Application No. 62/290,863, filed Feb. 3, 2016, and entitled "SECURE MANAGEMENT OF DIGITAL CONTRACTS, SYSTEM AND METHOD", the entirety of which is incorporated herein by reference.

FIELD

The present system and method relates to the construction, processing, storage, and management of digital contracts. The present system and method utilizes technology from the following fields, digital time-stamping, encryption, distributed storage, and distributed payment systems.

BACKGROUND

A contract may contain, but is not limited to, contract data and may also include metadata. Contract data includes, but is not limited to, a plurality of documents specifying details such as the counter-parties, terms and conditions, scope, arbitration conditions, signatures, notary seals, and may also include metadata. Contract metadata includes, but is not limited to, trustee identity and details, time of signature collection, and data used to maintain authenticity. Digital contracts are contracts that are processed and stored by computers. Digital contracts offer efficiency advantages over traditional contracts, by enabling faster and less expensive services. Contract construction and management services are increasingly being offered online using the Software as a Service business model.

A contract requires two or more parties (counter-parties) to be consummated. For authentication and verification purposes most contracts require a trustee to attest to the occurrence and exact details of the contract. The trustee is an entity which is trusted by all parties to the contract. The trustee can be a bank, title company, law firm, notary or any other entity trusted by all the contract counter-parties.

The requirement of a trustee introduces additional cost to the contract counter-parties. Contract counter-parties require the trustee to provide a minimum level of security for the construction, negotiation, agreement, proof and evidence of occurrence, possible future arbitration of the contract, and other processes relating to the contract. Contract construction refers to the process counter-parties undertake to arrive at an agreed upon contract that may be legally binding. This includes, but is not limited to, drafting the contract text, defining terms and conditions (e.g., the requirements specified in the contract that determine its validity), collecting signatures, and possibly generating a trusted time-stamp. A contract may have a signature expiry time that requires a counter-party to sign the contract before a specified date, in order for it to be valid. For example, the expiry time may be a particular date before which all of the signatures must be obtained, the expiry time may be a time by which the contract must be signed or the expiry time may be a period of time (hours, days, minutes, etc.) in which the contract must be signed. After the contract has been constructed, counter-parties may use a contract management service to store the contract over a period of time. Contract management refers to the process and systems that store and maintain contract data and metadata.

Digital contract construction and management systems require approaches to contract security that may be different from traditional contract security measures. For example, most traditional contracts require the physical signature of the counter-parties, whereas digital contracts use electronic signatures. Online services using electronic signatures must additionally verify the identities of the signators.

There are different approaches to digital contract construction and management depending on the users' requirements, the service providers' development and maintenance costs, and inherent technological limitations. Hereafter, we use "contract" and "digital contract" interchangeably. A person of ordinary skill in the art will find a generalization of the discussion to encompass applications with multiple counterparties straightforward.

Contract construction and management systems generally address five important security requirements, 1) privacy, 2) authenticity, 3) integrity, 4) synchrony, and 5) availability.

Privacy refers to the requirement that certain contract data and metadata, based on an agreement between counter-parties, is only intelligible to the counterparties involved in the contract. Third parties should not able to gain access to the content of the contract without the consent of at least one of the counter-parties.

In the start-of-the-art, privacy is often enforced using either symmetric or asymmetric encryption. With symmetric encryption, a single key is used to encrypt and decrypt the contract data and metadata. For example, two counter-parties may agree on a passphrase, and then use AES-256 to encrypt the finalized contract using this passphrase as the key. The term "key" in this context refers to a piece of information that determines the output of a cryptographic algorithm. Using this method, the encrypted contract data and metadata can then safely be stored in a public database for a future arbitrator to examine, upon one of the counter-parties making the passphrase and encrypted document available to the arbitrator.

With asymmetric encryption, or public-key cryptography, two separate keys are used to encrypt and decrypt contract data and metadata. An important advantage to asymmetric encryption over symmetric encryption is that the counter-parties do not need to share a secret passphrase.

The authenticity requirement has two components, 1) signature authenticity, and 2) identity association. Signature authenticity is the requirement that, 1) a signature can be associated with a unique signator, 2) generating the exact same signature by another party is extremely unlikely, and 3) other parties are able to confirm that the contract was signed by the said unique signator.

Identity association is the requirement that the signator can be associated with a real world identity (e.g., a particular individual or company) by all counter-parties and designated external parties. In practice, identity association typically requires trusting a third party (e.g., a certificate authority or public key infrastructure) to verify the identity of the contract signators.

Integrity is the requirement that a contract cannot be modified after it has been signed by all counter-parties. Specifically, once any counter-party signs the document, the contract cannot be changed without requiring all counter-parties to sign the contract again.

One method to ensure integrity is to apply a cryptographic hash function to the contract data (e.g., SHA-256). A cryptographic hash function generates a fingerprint for each contract. The fingerprint is then stored securely. One can be very confident that 1) if two contracts have the same fingerprint then the contracts are identical and 2) an attacker who gains access to the fingerprint cannot gain any meaningful information about the contract.

In the state-of-the-art, integrity and authenticity are provided using a Message Authentication Code or Hash-based Message Authentication Code algorithm (e.g. HMAC-SHA1), with the contract and signator's authentication key as input. These algorithms must be used in conjunction with other mechanisms to ensure security. For example, in some systems the fingerprint, signator's keys, and the original contract must be available to an arbitrator to verify integrity.

Synchrony is the requirement that all relevant parties agree that the contract was signed at a particular point in time. The relevant parties may include, but are not limited to, the contract counter-parties and possibly arbitrators. Specific contract details, for example, terms, conditions and execution, may be a function of time, which makes synchrony paramount to contract validation.

In the state-of-the-art, synchrony is achieved by trusted third party timestamping systems that keep track of the creation and modification times of the contract data. A limitation of these approaches is that they may require the trusted third party time-stamping service to be available at the time of verification or arbitration.

In the state-of-the-art privacy, authenticity, and integrity are addressed using industry standard cryptographic tools such as PGP with a public key infrastructure to perform real world identity association, however contracts also have the synchrony requirement that is not directly addressed by these systems. For example, an arbitrator and the contract counter-parties must also know and agree when the contract was signed in order to evaluate the terms and conditions.

A weakness of existing contract management systems is that either they do not provide trusted time-stamping, or the responsibility of synchrony is placed with a single third party (e.g., a single company, or organization). This requirement implies that if the said third party can no longer be trusted, or if it ceases operations, then previously generated time-stamps cannot be verified. This is a technical problem that exists with existing contract management systems.

Availability is the requirement that the contract be available to any designated third party in the future over some reasonable period of time (e.g., the lifetimes of the involved counter-parties) while maintaining the aforementioned security properties. This can be achieved by either assigning the responsibility of contract availability to the involved counter-parties or trusting a third party entity to store the contract on behalf the contract counter-parties.

Contract availability has two components, 1) time availability and 2) accessibility. Time availability refers to the period of time over which the contract data and metadata can be retrieved by any of the counter-parties. Accessibility is measured by the delay and cost incurred by the counter-parties to retrieve the contract's data and metadata. For example, a contract management system with high accessibility may cache contract data and metadata in several geographically disparate servers across the globe, so that global counter-parties can retrieve the contract data and metadata fast and at low cost.

A weakness of present contract management systems is that they assign the responsibility of contract availability to a single third party (e.g., company or organization). This limits the level of contract availability to the resources and lifetime of the said single third party. Note that this limitation grows with the size of the arbitration window, i.e., the longer the time period for potential arbitration, the more risk in trusting a third party.

There are five security requirements addressed by many of the state-of-the-art contract management systems. Recently Bitcoin Blockchain technology has been suggested as a possible solution to some of these security requirements. Below we discuss distributed public ledger technology, i.e., the Bitcoin network, in the context of contract management security. The paper "Bitcoin: A peer-to-peer electronic cash system" (Nakamoto, 2009) is incorporated into this application by reference. Users submit transactions to the Bitcoin network. Miners collect these transactions and group them together to construct a new block. Subsequently miners verify and attach the newly created block to the most recently verified block. Further, miners attach to each block a time-stamp of when the block was constructed that remains permanently unaltered. Miners then proceed to gather new transactions to construct the next block, and this process repeats. Nodes in the Bitcoin network store this chain of blocks, i.e., Blockchain, in a cryptographically secure way.

The Bitcoin protocol supports a scripting language, i.e., Bitcoin Script, to construct transactions with possible execution constraints. Bitcoin Script enables users to embed data into a transaction, via the OP_RETURN command in current the implementation.

An example constraint supported by Bitcoin Script is a deadline which is a predetermined execution time before which the transaction will not be processed, via the LOCK-TIME field in the current implementation. Other constraints include M-of-N multi signature which requires M counter-parties of N total counter-parties to sign the transaction before it is valid.

The Blockchain is maintained by thousands of nodes to ensure that the verified blocks remain permanently accessible and unaltered. The Blockchain is publicly accessible to download globally from many of these nodes. Nodes in the Bitcoin network have an incentive to maintain the network's security, availability, and robustness.

Historically Bitcoin has improved in response to security and performance concerns. As more and more applications are built on the Bitcoin network the security and longevity of this system is expected to exceed that of most centralized networks.

The Bitcoin network is a public, permissionless network. Blockchain technologies do not necessarily need to be public or permissionless. Entities can create a distributed private ledger consisting of a group of entities that participate in the private network and restrict who can publish or access the network.

A person of ordinary skill in the art in the field of this system and method is familiar with distributed source control systems, such as Git.

A contract construction or contract management system is said to be scalable if it can support an increasingly large number of contracts without severely impacting key performance metrics such as processing time, cost, or availability.

Digital contract management systems can enable automated contract execution with execution constraints. The management system may automatically trigger and execute events specified in the contract.

Most contract management systems require users to place trust in a single or a few third-parties. These systems do not necessarily meet the identified security requirements for contract management systems. What is needed is a contract management system that reduces the amount of trust users place in a single or a few third parties and improves upon the security limitations of the current state-of-the-art.

BRIEF DESCRIPTION OF THE DRAWINGS

For a more complete understanding of the invention, reference is made to the following description and accompanying drawings, in which.

DETAILED DESCRIPTION OF ONE OR MORE EMBODIMENTS

The system and method may achieve availability of contract data and metadata and reduce the amount of third party trust required for secure contract management. The system and method are able to construct contracts with time availability and accessible contract construction timestamps and securely store contract data and metadata. The system and method may achieve scalable contract management. The system and method support contract execution.

To achieve greater security properties than those of the existing state-of-the-art contract management systems, the system and method facilitates contract construction and places contract data and metadata across several distributed systems. The system and method uses a process consisting of several steps described herein, to construct and manage digital contracts.

The system and method discloses a process whereby counter-parties construct a contract. The system and method subsequently stores the contract data and metadata in a private repository (e.g., a distributed version control system) that is accessible via a URL to entities with the necessary credentials. The system and method also stores contract data and metadata on a Distributed Ledger. The system and method generates and submits records that contain the encoded URL and a reference to the contract data. For example, the system and method generates and submits Bitcoin transactions that contain the encrypted URL and cryptographic hash of the contract data. These records are subsequently placed on a Distributed Ledger, e.g., on the Bitcoin Blockchain. Each record belongs to a block which contains metadata that may include a permanent time-stamp. References to these records are added to the private repository, thus establishing a mutual reference between the private repository and the records stored on the Distributed Ledger. The contract data and metadata are subsequently accessible in original, encrypted, or cryptographic hash format, from the Distributed Ledger. A counter-party may specify contract constraints, such as a predetermined execution time.

The system and method accordingly comprises the several steps and the relation of one or more of such steps with respect to each of the others, and the apparatus embodying features of construction, combinations of elements and arrangement of parts that are adapted to affect such steps, all is exemplified in the following detailed disclosure.

Figure 1:
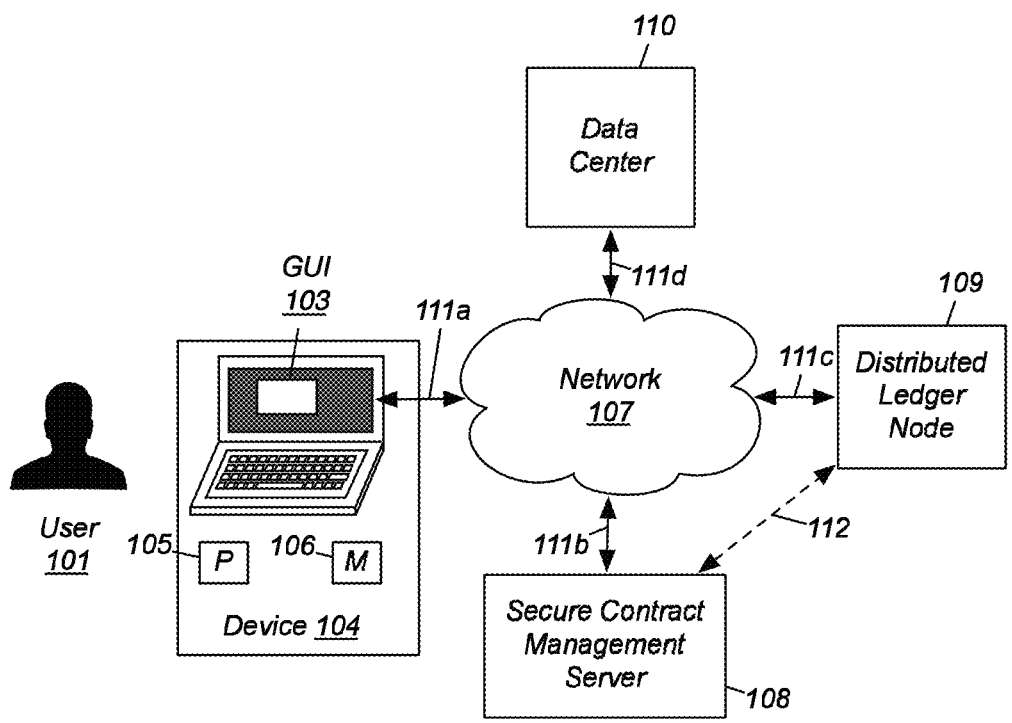
FIG. 1 illustrates an example secure contract management system environment.

The arrangement in FIG. 1 shows an exemplary arrangement of one embodiment of the system. In this embodiment, there is an environment 100 consisting of a user 101 using a device 104 which interacts with a Secure Contract Management Server 108. The Secure Contract Management Server 108 is connected to a network 107 using an interface 111b. The device 104 is a computer consisting of at least a processor 105 and memory 106. The user interacts with the server 108 by using a GUI 103 running on the device. The device 104 communicates with a server 108 over a network 107, using a network interface 111a. The device 104 and server 108 may communicate with a Data Center 110 that is connected to the network using a network interface 111d. The device 104 and server 108 may communicate with a Distributed Ledger Node 109 that is connected to the network 107 using a network interface 111c. The Distributed Ledger Node 109 provides services for specific clients to access and modify a distributed public, or private, ledger 401 (e.g., Bitcoin). The server 108 may communicate with the Distributed Ledger node through an interface 112 that is not connected to the network 107. The Secure Contract Management Server 108 constructs, manages and securely stores contract data and metadata on behalf of the users.

The Distributed Ledger Node 109 executes software that connects to a network that maintains a distributed ledger and provides an API to expose distributed ledger functions. In this disclosure, the software referred to herein is one or more pieces of software comprising a plurality of lines of computer code that may be executed by a processor with memory so that the processor is configured to perform the operations specified by the software. Distributed ledger functions include, but are not limited to, managing wallets, creating transactions, validating transactions, and determining the number of block confirmations for a transaction. This API is utilized by for the Secure Contract Management Server 108.

In some embodiments, the Distributed Ledger Node 109 runs a Bitcoin client full node and provides a REST API to clients, for example the Secure Contract Management Server 108. In some embodiments, the Distributed Ledger Node 109 interfaces with the Bitcoin network using specialized hardware components, for example Bitcoin ASIC (Application Specific Integrated Circuit). The Distributed Ledger Node 109 may be implemented on a computer system that has a processor and memory.

The Data Center 110 may consist of a plurality of servers, possibly running virtualization software. The servers may execute software in a multi-tenant environment on behalf of customers. The Data Center 110 may provide service level agreements (SLA) to ensure a minimum level of service characteristics, possibly including software performance, security, and data storage redundancy. Such software may include, but is not limited to, web servers (e.g., Apache, Nginx), light-weight container management (e.g., Docker), and version control systems (e.g., Git).

The Secure Management Server 108 executes software to perform contract management and contract construction functions. Such software may include, but is not limited to, a Bitcoin Full node (e.g., bitcoind), Bitcoin Simplified Payment Verification (SPV) clients (e.g., bitcoinj), version control systems (e.g., Git), relational databases (e.g., PostgresSQL), non-relational databases (e.g., mongoDB), queuing (e.g., RabbitMQ), and containerization (e.g., Docker) software.

The Device 104 executes software that communicates with the Secure Management Server 108 and provides a GUI with affordances for the user. Such software may include, but is not limited to, a web browser (e.g., Safari, Google Chrome), a web application (e.g., written in JavaScript, HTML), a native application (e.g., written in Java, Swift, or Objective-C), or a "hybrid" application (e.g., utilizing the ionic, Phone Gap, or Cordova frameworks).

Figure 2:
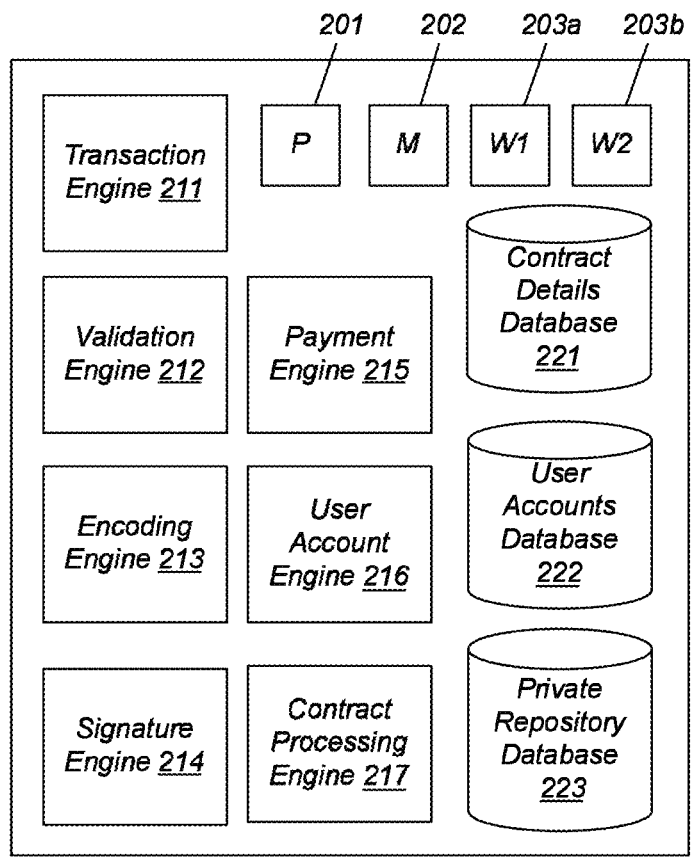
FIG. 2 illustrates an example secure contract management server.

The arrangement in FIG. 2 illustrates the elements in the Secure Contract Management Server 108 in one embodiment. The server consists of at least a processor 201 and memory 202, as well as multiple engines 211-217 and databases 221-223. Each engine 211-217 and/or each database 221-223 may be implemented in hardware or software. When a particular engine or database is implemented in software, the engine or database may be a plurality of lines of computer code/instructions that may be executed by a processor of the server 108 so that the processor is configured to perform the operations of the particular engine or the database. When the particular engine or database is implemented in hardware, the engine or database may be a piece of hardware, such as an ASIC, integrated circuit, appliance, microcontroller, etc. that performs the operations of the particular engine or database. The engines communicate with each other, the databases, and other hosts on the network, to perform contract management functions. The server 202 stores and has access to at least two Bitcoin Wallets, W1 203a and 203b. Functions of each engine may be implemented in software, hardware or a combination thereof. The engine may execute software as processes across multiple physical or virtual servers, each server with a plurality of processors and memory. The engine and databases may store and load data to and from a plurality of storage systems that use volatile and nonvolatile memory and storage. Certain storage hardware used by the databases and engines may temporarily be disconnected from these systems (e.g., Bitcoin cold storage or offline hardware wallet). The Transaction Engine 211 performs functions possibly including, but not limited to, constructing Distributed Ledger transactions, managing Distributed Ledger wallets (e.g., Bitcoin SPV wallets), submitting transactions to a Distributed Ledger node (e.g., 109), and computing transaction fees.

The Validation Engine 212 performs functions possibly including, but not limited to, determining the number of block confirmations for a Distributed Ledger transaction, determining the transactions within a block, and maintaining a list of unconfirmed transactions.

The Encoding Engine 213 performs functions possibly including, but not limited to, computing symmetric encryption functions (e.g., AES-256), computing cryptographic hash functions (e.g., SHA-256), validation of cryptographically signed documents, executing compression algorithms (e.g., GZip), computing message authentication codes (e.g., HMAC-SHA256), and character-encoding transformations.

The Signature Engine 214 performs functions possibly including, but not limited to, collecting signatures from users. The Signature Engine 214 may collect, for example, through electronic signatures or uploading photos of signatures.

The Payment Engine 215 performs functions possibly including, but not limited to, issuing payments on behalf of users, verifying payment receipt, moving funds between escrow accounts, and maintaining payment histories.

The User Account Engine 216 performs functions possibly including, but not limited to, user registration, user authentication, and password management.

Figure 3:
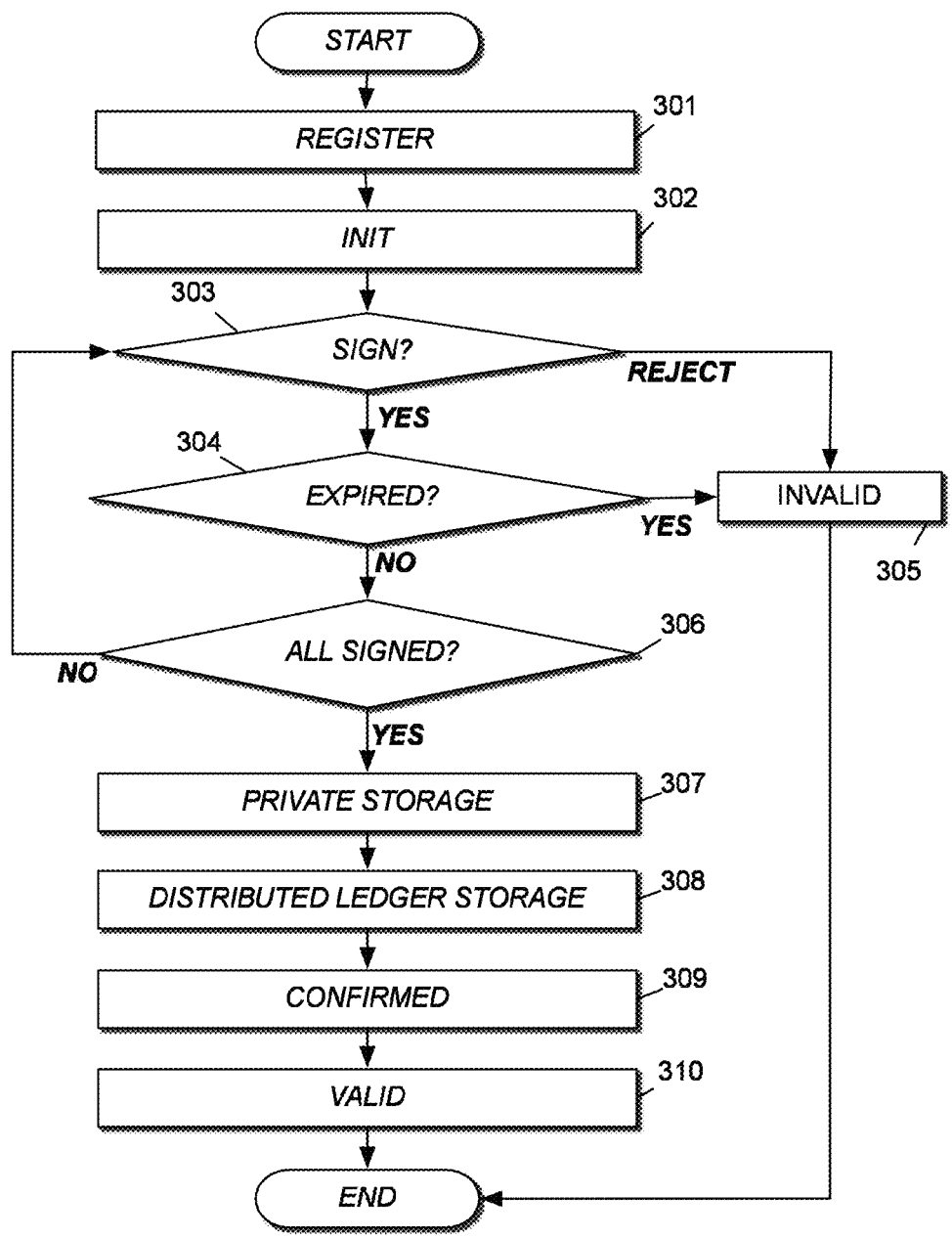
FIG. 3 illustrates an example flowchart for facilitating secure contract management storage.

The Contract Processing Engine 217 manages the state of a contract as it is processed according to FIG. 3. This engine performs functions possibly including, but not limited to, contract negotiation, collection of contract details, and coordination with the other engines.

The Contract Details Database 221 may store data including, but not limited to, contract data, contract metadata, distributed ledger transaction information (e.g., Bitcoin transaction hash identifiers), user information (e.g., user IDs and signatures), a URL referencing the Private Repository Database 223, access credentials to the Private Repository Database, and the contract processing state (e.g., the state of the contract with respect to FIG. 3).

The User Accounts Database 222 may store data including, but not limited to, user's name, address, system user ID, password, cryptographic hash of the password, signature, private key, email address, photo, bank account details, social security number, and other identity information.

The Private Repository Database 223 may store data including, but not limited to, contract data, contract metadata, distributed ledger transaction information (e.g., Bitcoin transaction hash identifiers), user information (e.g., user IDs and signatures), and repository metadata (e.g., revision history, required database authentication credentials).

The elements of the system shown in FIGS. 1 and 2 provide a technical solution (using the various elements described above and the method described below) to address the technical problem of exiting contract management systems described above.

The flowchart in FIG. 3 illustrates an exemplary secure contract management process, in a preferred embodiment. These steps illustrated in the flowchart may be executed across a plurality of servers that communicate over a network. In some embodiments, a step in the flowchart execution may be executed on specialized hardware, e.g., an ASIC, FPGA, or GPU. This flowchart maybe executed by the Secure Contract Management Server 108 as follows:

The REGISTER state 301 represents the user registration with the contract management server 108. Users 101 register with the server 108 and create accounts using a browser through a web interface GUI 103 where they specify an email and password. The email address is then verified. A CAPTCHA is used during account registration and authentication. Registration functions are performed by the User Accounts Engine 216 which modifies the User Accounts Database 222. In some embodiments users can upload private keys that are used to sign documents and private keys that belong to Bitcoin wallets. In some embodiments a default Bitcoin wallet may be assigned to users. In some embodiments users may be required to prove their real world identity, by means of providing additional information, e.g., uploading a drivers license photo or providing a subsequently validated bank account number.

The INIT state 302 represents the construction of the contract. In this state a user, labelled the first counter-party, specifies all the contract details. These details may include, but are not limited to, the counter-party email addresses, the contract signature expiry time, a digital copy or scanned copy or photograph of the contract document, an optional message, and optionally the required payment details of the contract. Once the first counter-party has specified all the contract details, she signs the contract and sends it to the counter-party via the system, labeled the second counter-party, or counter-parties. Any of the counter-parties may be invited to register during this state. Contract construction functions are performed by the Contract Processing Engine 217 which modifies the Contract Details Database 221. Contract signing is executed by the Signature Engine 214 which modifies the Contract Details Database 221. In some embodiments, the contract details are immutable after the INIT state, and cannot be altered. In some embodiments the counter-parties are identified using a user name. In some embodiments the counter-parties are identified using a public key or a Bitcoin wallet. In some embodiments the contract document is generated via a contract template. In some embodiments there are multiple contract documents. In some embodiments the payment may be in fiat currency or digital currency.

The SIGN state 303 represents the signature collection state. Each counterparty can sign, ignore, or reject the contract. If the contract is rejected by any of the counter-parties, or it has not been signed by all counter-parties by the expiry time, it will become INVALID 305. Once a counter-party signs the contract it can no longer reject the contract. If all counter-parties sign the contract, then the contract goes into the ALL SIGNED 306 state. The Signature Engine 214 accesses and modifies the Contract Details Database 221 and User Accounts Database 222. The counter-parties may sign the document using a document signature mechanism which communicates with the Signature Engine 214. These mechanisms include, but are not limited to, signature using public key cryptography, e-signature, a hand drawn signature using a mouse or touchscreen, or a photo of a physical signature. In some embodiments the contract is negotiated by the counter-parties. In such an embodiment, each counter-party can suggest changes to the contract. The suggested change effectively generates a new contract. Subsequently, all other counter-parties can suggest additional changes to, ignore, reject, or sign the new contract. In some embodiments each original counter-party can specify a proxy signator to sign on their behalf. In such an embodiment, the proxy signator is another registered user that is identified by the original counter-party. To use proxy signators, the user who constructs the contract must enable proxy signators for the contract as part of its construction. Contracts that allow proxy signators are indicated as such to all of the counter-parties. In some embodiments each counter-party can specify a script as the proxy signator whose decision to reject, ignore, or sign the contract is executed by the contract management system. The capabilities and functionality of the script are predetermined and limited by the contract management system. The script analyzes the contract data and metadata to determine whether to reject, ignore, or sign the contract. The script's decision is sent to the contract management system which executes the decision on behalf of the counter-party.

In some embodiments, the user who constructs the contract specifies that only a subset of the counter-parties need to sign the contract for it to enter the ALL SIGNED 306 state and proceed to the PRIVATE STORAGE 307 state. For example, in a "2 of 3" contract any 2 out of the 3 counter-parties need to sign the contract for it to enter the ALL SIGNED 306 state and proceed to the PRIVATE STORAGE 307 state. In some embodiments the user who constructs the contract specifies payment amounts and conditions between counter-parties. In such an embodiment counterparties must deposit the specified amount of funds into escrow accounts provided to them by the contract management system before they can sign. If the contract is not signed by all counter-parties by the expiry time the contract management system returns the deposited escrow funds to each respective counter-party. If the contract is signed by all the counter-parties by the expiry time the payment subsequently occurs after the contract is signed. In some embodiments the counter-parties can specify the times and amounts of payment, and the payments will automatically be sent at the predetermined times. These payment functions are performed by the Payment Engine 215.

The PRIVATE STORAGE 307 state occurs once all of the counter-parties have signed the contract. In this state the contract data and metadata 414 are stored in the Private Repository Database 223, e.g., in the distributed revision control system Git. The contract data and metadata in the Private Repository Database 223 are accessible via a URL to users with the necessary credentials, using the view 413. As an additional layer of security the contract data and metadata 414 may also be encrypted to require that any entity who wants to access the data has the necessary credentials. Credentials include, but are not limited to, private keys and passwords. In some embodiments the contract data and metadata 414 are stored in several separate repositories. In such an embodiment a counter-party may download the contract data and metadata 414 to the memory 106 on a user's device. The contract data and metadata 414 may be stored in a repository located in a Data Center 110, e.g., in a cloud.

Once the contract data and metadata have been stored in the Private Repository Database 223, the contract enters the DISTRIBUTED LEDGER STORAGE 308 state. The Transaction Engine 211 creates two Bitcoin transactions between wallets W1 203a and W2 203b. These wallets 203a, 203b are managed by the Transaction Engine 211. The first transaction (e.g., record 404b) includes the URL reference 420 (e.g. reference 418) to the stored contract data and metadata, described in the paragraph above, within the argument of the OP_RETURN command. This URL may be encoded, e.g., encrypted, by the Encoding Engine 213. The second transaction (e.g., record 404a) includes a cryptographic hash 422 of the contract data (e.g., reference 415), within the argument of the OP_RETURN command. The cryptographic hash is generated by the Encoding Engine 213, The Contract Details Database 221 and the Private Repository Database 223 are updated to contain the references 409, 411 to these transactions (e.g., record 408 is updated to contain references 424, 426). The transaction references may be the Bitcoin transaction hash identifiers.

The Transaction Engine 211 includes the necessary transaction fees for the transactions and submits them to the Bitcoin network via the Distributed Ledger Node 109. The two transactions are subsequently added to the Distributed Ledger 401 within a single or two separate blocks by Bitcoin miners. These blocks are subsequently confirmed by the Bitcoin network as discussed in the background. Once the transactions are submitted to the Bitcoin network via the Distributed Ledger Node 109, the Validation Engine 212 periodically communicates with the Distributed Ledger Node 109 to determine the most recent number of block confirmations and modifies the Contract Details Database 221 accordingly. The Validation Engine 212 continues this process until both blocks have received a certain number of block confirmations.

The Transaction Engine 211 may resubmit a transaction up to a specified number of times via the Distributed Ledger Node 109 if the transaction does not appear in a block within a specified duration, or if the block does not receive the necessary number of confirmations within a specified duration. If the maximum number of resubmissions is exceeded the contract goes to the INVALID 305 state and the user is notified of the failure. The contract goes to the CONFIRMED 309 state once each transaction's block has received the necessary number of confirmations.

In some embodiments the URL reference is encrypted using the AES-256 encryption algorithm by the Encoding Engine 213. In some embodiments the contract cryptographic hash is computed using the SHA256 cryptographic hash function by the Encoding Engine 213.

In some embodiments contract data and metadata are included on the Bitcoin Blockchain using multiple transactions that encode the data as invalid public key hashes which are included in transactions, by the Encoding Engine 213 and Transaction Engine 211. In such an embodiment, the Pay-to-PubkeyHash Bitcoin Script is used with the contract data or metadata included as the public key hash data. The Bitcoins sent to these addresses are not spendable since the corresponding public key is not known.

In some embodiments the encoded data and metadata are stored in a distributed private ledger and optionally in the Bitcoin network. In some embodiments a contract execution constraint is added to the transaction. In such an embodiment, the constraint is encoded as a Bitcoin Script field in a transaction, by the Transaction Engine 211. For example, the Transaction Engine 211 may specify a time in the transaction's LOCKTIME field to ensure that it is executed only after the specified time.

In some embodiments the number of necessary block confirmations is 6. In some embodiments different contracts require a different number of block confirmations. In some embodiments no block confirmations are necessary. In such an embodiment, the contract enters the CONFIRMED 309 state immediately after the Validation Engine 212 has determined that each transaction is in a block.

In the CONFIRMED 309 state the Contract Processing Engine 217 notifies the counter-parties that the data and metadata are securely stored. The Contract Processing Engine 217 provides the counter-parties with references to the contract's respective Bitcoin transactions (e.g., records 404a, 404b) and private repository URL, as well as the access credentials to the private repository. The Contract Processing Engine 217 updates the Private Repository Database 223 to include the Bitcoin transaction references (e.g., references 424 and 426). Once all of these updates have occurred the contract moves to the VALID 310 state. In some embodiments the references stored in the Private Repository Database 223 (e.g., references 424 and 426) include the hash identifiers of the Bitcoin transactions generated in the DISTRIBUTED LEDGER STORAGE 308 state. The VALID 310 state represents the final processing state of the contract. In this state the contract data and metadata are available for download by the counterparties via the private repository.

Figure 4:
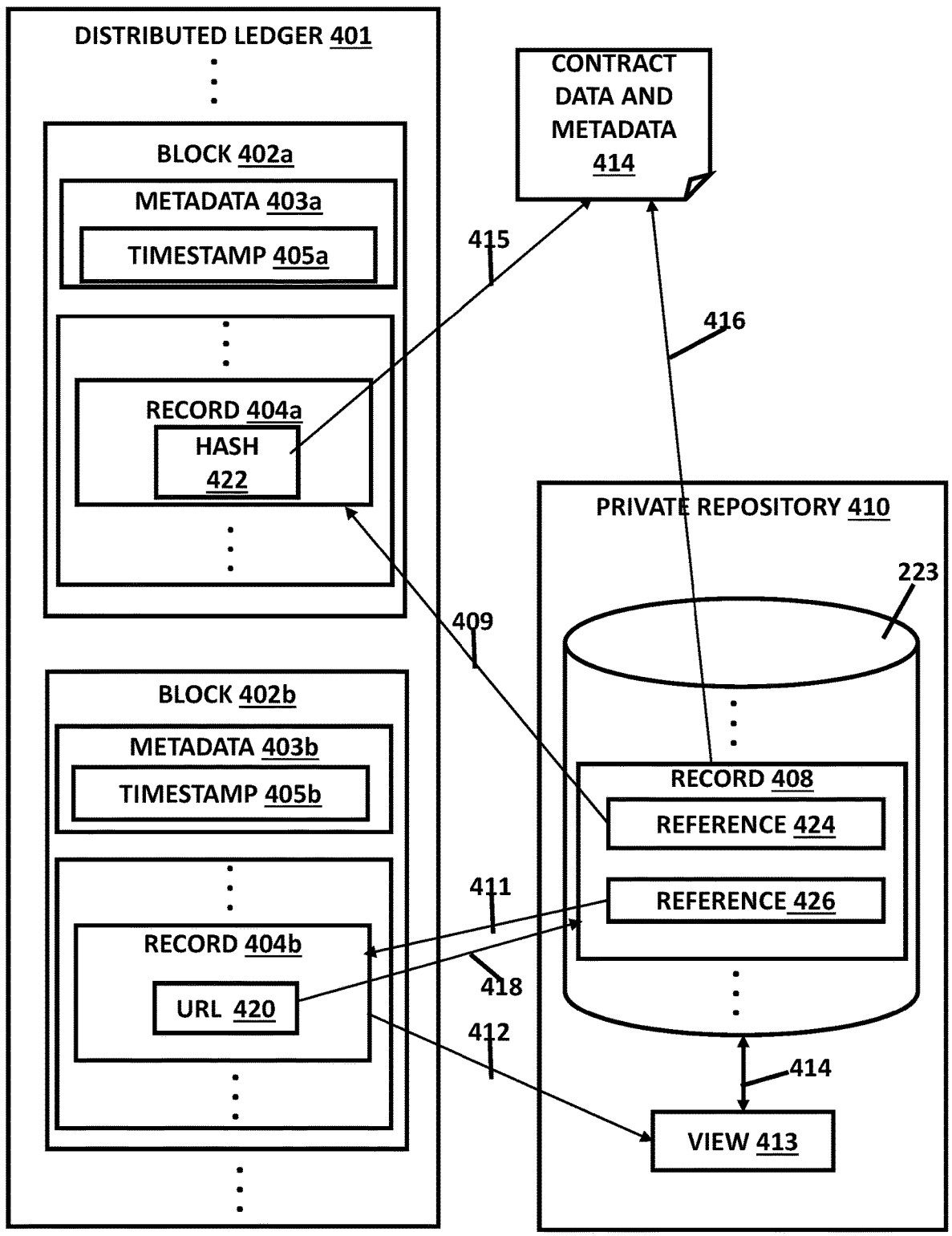
FIG. 4 illustrates an example secure contract data and metadata storage arrangement.

FIG. 4 illustrates the state of the different storage systems once the contract enters the VALID 310 state. Distributed Ledger 401 represents a distributed public, or private, ledger comprising of a number of blocks (e.g., 402a, 402b). Each block contains the block metadata (e.g., 403a, 403b) and a number of records (e.g., 404a, 404b). The block metadata (e.g., 403a, 403b) is shared by all of the block's records and may include a time-stamp (e.g., 405a, 405b) of when the block was generated. In Bitcoin, the Distributed Ledger 401 refers to the Blockchain, the block metadata (e.g., 403a, 403b) refers to the block header, and each record (e.g., records 404a, 404b) refers to a transaction within the block.

The private repository 410 includes a database 223 comprising of a number of records (including record 408), that are accessible by users via a view 413. The view 413 provides entities with the necessary credentials access to the database 223 via a URL. The view 413 communicates 414 with the database 223.

Contract data and metadata 414 represents the user's contract data and metadata. The Distributed Ledger 401 includes a record 404a (with the hash 422 of the contract data) that references 415 the contract data and metadata 414. The Distributed Ledger 401 also includes a record 404b (with the URL 420) which contains a, reference 412 to the view 413 of the private repository 410. The private repository 410 includes a record 408 that contains references 424, 426 to these Bitcoin transactions 404a, 404b. The record 408 also contains an entire copy 416 of the contract data and metadata 414.

It will thus be seen that the objects set forth above, among those made apparent from the preceding description, are efficiently attained and, because certain changes may be made in carrying out the above method and in the construction(s) set forth without departing from the spirit and scope of the invention, it is intended that all matter contained in the above description and shown in the accompanying drawings shall be interpreted as illustrative and not in a limiting sense.

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the disclosure and its practical applications, to thereby enable others skilled in the art to best utilize the disclosure and various embodiments with various modifications as are suited to the particular use contemplated.

The system and method disclosed herein may be implemented via one or more components, systems, servers, appliances, other subcomponents, or distributed between such elements. When implemented as a system, such systems may include an/or involve, inter alia, components such as software modules, general-purpose CPU, RAM, etc. found in general-purpose computers. In implementations where the innovations reside on a server, such a server may include or involve components such as CPU, RAM, etc., such as those found in general-purpose computers.

Additionally, the system and method herein may be achieved via implementations with disparate or entirely different software, hardware and/or firmware components, beyond that set forth above. With regard to such other components (e.g., software, processing components, etc.) and/or computer-readable media associated with or embodying the present inventions, for example, aspects of the innovations herein may be implemented consistent with numerous general purpose or special purpose computing systems or configurations. Various exemplary computing systems, environments, and/or configurations that may be suitable for use with the innovations herein may include, but are not limited to: software or other components within or embodied on personal computers, servers or server computing devices such as routing/connectivity components, hand-held or laptop devices, multiprocessor systems, microprocessor-based systems, set top boxes, consumer electronic devices, network PCs, other existing computer platforms, distributed computing environments that include one or more of the above systems or devices, etc.

In some instances, aspects of the system and method may be achieved via or performed by logic and/or logic instructions including program modules, executed in association with such components or circuitry, for example. In general, program modules may include routines, programs, objects, components, data structures, etc. that perform particular tasks or implement particular instructions herein. The inventions may also be practiced in the context of distributed software, computer, or circuit settings where circuitry is connected via communication buses, circuitry or links. In distributed settings, control/instructions may occur from both local and remote computer storage media including memory storage devices.

The software, circuitry and components herein may also include and/or utilize one or more type of computer readable media. Computer readable media can be any available media that is resident on, associable with, or can be accessed by such circuits and/or computing components. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and can accessed by computing component. Communication media may comprise computer readable instructions, data structures, program modules and/or other components. Further, communication media may include wired media such as a wired network or direct-wired connection, however no media of any such type herein includes transitory media. Combinations of the any of the above are also included within the scope of computer readable media.

In the present description, the terms component, module, device, etc. may refer to any type of logical or functional software elements, circuits, blocks and/or processes that may be implemented in a variety of ways. For example, the functions of various circuits and/or blocks can be combined with one another into any other number of modules. Each module may even be implemented as a software program stored on a tangible memory (e.g., random access memory, read only memory, CD-ROM memory, hard disk drive, etc.) to be read by a central processing unit to implement the functions of the innovations herein. Or, the modules can comprise programming instructions transmitted to a general purpose computer or to processing/graphics hardware via a transmission carrier wave. Also, the modules can be implemented as hardware logic circuitry implementing the functions encompassed by the innovations herein. Finally, the modules can be implemented using special purpose instructions (SIMD instructions), field programmable logic arrays or any mix thereof which provides the desired level performance and cost.

As disclosed herein, features consistent with the disclosure may be implemented via computer-hardware, software and/or firmware. For example, the systems and methods disclosed herein may be embodied in various forms including, for example, a data processor, such as a computer that also includes a database, digital electronic circuitry, firmware, software, or in combinations of them. Further, while some of the disclosed implementations describe specific hardware components, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various routines, processes and/or operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Aspects of the method and system described herein, such as the logic, may also be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, microcontrollers with memory (such as EEPROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) though again does not include transitory media. Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Although certain presently preferred implementations of the invention have been specifically described herein, it will be apparent to those skilled in the art to which the invention pertains that variations and modifications of the various implementations shown and described herein may be made without departing from the spirit and scope of the invention.

Accordingly, it is intended that the invention be limited only to the extent required by the applicable rules of law.

While the foregoing has been with reference to a particular embodiment of the disclosure, it will be appreciated by those skilled in the art that changes in this embodiment may be made without departing from the principles and spirit of the disclosure, the scope of which is defined by the appended claims.

The invention claimed is:

1. A system comprising:
one or more processors;
a memory storing instructions that when executed by the one or more processors causes the one or more processors to perform the operations to:
store (i) contract data and (ii) contract metadata for a signed contract between two or more entities, wherein the signed contract is accessed at the private repository using a uniform resource locator (URL);
for a first block, encode the URL, wherein the URL is a first reference to the private repository and generate a first transaction including the encoded URL;
for a second block, generate a cryptographic hash of the contract data, wherein the cryptographic hash is a second reference to the private repository and generate a second transaction including the cryptographic hash of the contract data;
submit the first and second transactions to a blockchain system,
store, in the private repository, a third reference to the first and second submitted transactions, wherein the third reference is a reference to the blockchain system, and
determine a confirmation of the submission of the first and second transactions.

2. The system of claim 1, wherein the signed contract has a threshold number of signatures required for the signed contract.

3. The system of claim 2, wherein the one or more processors further perform the operations to manage one or more payments between the two or more entities to the signed contract.

4. The system of claim 1, wherein the signed contract is signed by a first user uploading a first private key.

5. The system of claim 1, wherein the private repository is accessible for users using a view.

6. The system of claim 1, wherein the encoded URL is encrypted.

7. A method comprising:
storing, in a private repository, (i) contract data and (ii) contract metadata for a signed contract between two or more entities, wherein the signed contract is accessed at the private repository using a uniform resource locator (URL);
for a first block, encoding, by a processor of a computer system, the URL, wherein the URL is a first reference to the private repository and generating, by the processor of the computer system, a first transaction including the encoded URL;
for a second block, generating, by the processor of the computer system, a cryptographic hash of the contract data, wherein the cryptographic hash is a second reference to the private repository and generating, by the processor of the computer system, a second transaction including the cryptographic hash of the contract data;
submitting, by the processor of the computer system, the first and second transactions to a blockchain system,
storing, in the private repository, a third reference for the first and second submitted transactions, wherein the third reference is a reference to the blockchain system; and
determining, by the processor of the computer system, a confirmation of the submission of the first and second transactions.

8. The method of claim 7 further comprising signing the signed contract by a first user uploading a first private key.

9. The method of claim 7 further comprising viewing the private repository using a view.

10. The method of claim 7, wherein encoding the URL further comprises encrypting the URL.

11. The method of claim 7, wherein submitting the first and second transactions further comprise using an OP_RETURN command.

12. The method of claim 7, wherein determining the confirmation further comprises a CONFIRMED state based on a threshold number of blocks or an INVALID state.

13. The method of claim 7, wherein the stored contract data and meta data are encrypted.

14. The method of claim 7 wherein the signed contract has a threshold number of signatures required for the signed contract.

15. A nontransitory computer readable medium storing instructions that when executed by a processor causes the processor to perform the operations of:
store, in a private repository, (i) contract data and (ii) contract metadata for a signed contract between two or more entities, wherein the signed contract is accessed at the private repository using a uniform resource locator (URL);
for a first block, encode the URL, wherein the URL is a first reference to the private repository and generate a first transaction including the encoded URL;
for a second block, generate a cryptographic hash of the contract data, wherein the cryptographic hash is a second reference to the private repository and generate a second transaction including the cryptographic hash of the contract data;
submit the first and second transactions to a blockchain system;
store, in the private repository, a third reference to the first and second submitted transactions, wherein the third reference is a reference to the blockchain system, and
determine a confirmation of the submission of the first and second transactions.

16. The nontransitory computer readable medium of claim 15, wherein the signed contract is signed by a first user uploading a first private key.

17. The nontransitory computer readable medium of claim 15, wherein the private repository is viewed using a view.

18. The nontransitory computer readable medium of claim 15, wherein the encoded URL is encrypted.

19. The nontransitory computer readable medium of claim 15, wherein the first and second transactions use an OP_RETURN command.

20. The nontransitory computer readable medium of claim 15, wherein determining the confirmation further comprises a CONFIRMIED state based on a threshold number of blocks or an INVALID state.

21. The nontransitory computer readable medium of claim 15, wherein the stored contract data and meta data are encrypted.

22. The nontransitory computer readable medium of claim 15, wherein the signed contract has a threshold number of signatures required for the signed contract.

\* \* \* \* \*